United States Patent Office 2,940,940
Patented June 14, 1960

2,940,940
DEHYDROGENATION CATALYST

Warren E. Armstrong, Lafayette, and John N. Wilson, Berkeley, Calif., assignors to Shell Oil Company, a corporation of Delaware No Drawing. Filed Mar. 27, 1958, Ser. No. 724,483

5 Claims. (Cl. 252—443)

This invention relates to new and improved dehydrogenation catalysts and to their preparation. More particularly, the invention relates to an improvement in pelletized alkalinized iron oxide catalysts suitable for the dehydrogenation of olefins to diolefins in the presence of steam at temperatures in the range of about 550 to 680° C.

An object of the invention is to provide new catalysts of the above type which have improved crushing resistance and may be pelletized under mild pressures. Catalyst pellets formed under mild pressures have a low density and afford superior selectivity in their catalytic action when applied for the production of butadiene, isoprene, styrene and related processes for which they are intended.

Another object of the invention is to provide new catalysts of the above type which are much less prone to lose crushing resistance upon storage, handling and the like.

In outline, new and improved catalysts of the above type are prepared by preparing pellets of alkalinized iron oxide catalyst in which the alkalinizing agent is present in the form of potassium carbonate and then reacting the pellets with water and carbon dioxide to convert the potassium carbonate in the formed pellets predominantly to potassium bicarbonate. When the potassium bicarbonate is formed from potassium carbonate within the pellets the strength of the pellets and their ability to retain their strength may be improved.

The term "alkalinized iron oxide dehydrogenation catalyst" is used to denote a known and widely used type of catalyst in which the predominating dehydrogenating constituent is iron oxide and which contains an alkaline compound of potassium in appreciable amounts and which is useful in the dehydrogenation of normal butylenes to butadiene in the presence of steam at temperatures within the range of about 550 to 680° C. They normally do not contain any appreciable amount of a carrier or inert diluent material but such extenders may be used. Suitable diluents are, for example, activated coke, activated zinc spinel, expanded vermiculite, calcined colemanite. One commercially used catalyst contains magnesia as a diluent.

The catalysts normally contain minor amounts of a heavy metal oxide stabilizer such as an oxide of chromium, manganese or bismuth. Also, they may contain small amounts of other promoter materials such as the oxides of copper, zinc, aluminum, silicon and titanium which may have a beneficial effect in certain respects.

Of the alkali metals which may be used to alkalinize the catalysts potassium is the most efficient and is used commercially. Rubidium and caesium are too scarce and costly for practical application and sodium and lithium are less effective. The potassium in the catalyst may vary in concentration from about 1% to about 30% based on the finished catalyst. A small amount of potassium, e.g. 1%, is sufficient to afford a practical catalyst but larger amounts are usually used since they are more effective and allow lower partial pressures of steam to be used in the dehydrogenation. Potassium concentrations as high as about 53% $K_2CO_3$ have been used commercially and even higher concentrations can be used.

The catalysts of the type just described are normally prepared according to the general method disclosed in U.S. Patent No. 2,461,147 which is to combine powdered iron oxide or carbonate along with the other ingredients, e.g. chromium oxide, with potassium carbonate and sufficient water to form a moist mix which is formed into catalyst pellets of suitable size, e.g. 1 x 1 mm. to 5 x 5 mm. cylinders. The pellets are then dried and calcined.

Iron carbonate is substantially the equivalent of the iron oxide. It is converted to iron oxide during use of the catalyst. Also, if desired, the pellets can be calcined under conditions to convert the iron carbonate to the oxide prior to use. If potassium nitrate is used in place of potassium carbonate the calcination converts the potassium nitrate to potassium oxide. The catalyst is then treated under conditions to convert the potassium oxide to potassium carbonate. If potassium hydroxide is originally used in place of potassium carbonate the catalyst is also treated after calcination to convert the potassium to the carbonate. If potassium bicarbonate is originally used in place of potassium carbonate the catalyst ends up the same because potassium bicarbonate, which is thermally unstable, decomposes to give potassium carbonate during the drying of the pellets. Potassium bicarbonate is not used since it is more costly than potassium carbonate, ends up as potassium carbonate, and offers no advantage.

In the preparation of these catalysts according to the present invention it is preferred to use potassium carbonate in the preparation as is the usual practice. It is possible to start with potassium nitrate or potassium hydroxide, calcine to convert the potassium to the oxide and then treat the catalyst with carbon dioxide under conditions to produce the carbonate but this is more costly in raw materials and processing. It would be possible, at least theoretically, to start with potassium bicarbonate and dry the catalyst very carefully to prevent decomposition of the bicarbonate thereby producing a catalyst containing the potassium in the form of potassium bicarbonate. However, the pellets are relatively weak and obviously could not be strengthened by the method of the invention since the potassium in the pellets would be already in the form of potassium bicarbonate. Furthermore, this is more of a theoretical than a practical possibility since potassium bicarbonate is so easily decomposed by heat than even relatively careful drying of the formed pellets causes substantial decomposition to the carbonate.

In one embodiment of the present invention, the potassium carbonate and other catalyst ingredients are mixed with sufficient water to form a moist mix which is formed into catalyst pellets which are then dried and calcined, e.g. between 200 and 800° C. and then further treated, if necessary, to produce pellets in which the potassium is present as potassium carbonate. These pellets are then reacted with water and carbon dioxide at a temperature below about 100° C. until the potassium in the formed pellets is predominantly converted to potassium bicarbonate. The reaction is quite exothermic and a temperature rise is noted. There is no danger of runaway, however, since the bicarbonate is unstable at elevated temperatures. Consequently, as the temperature rises due to the reaction the reverse reaction begins to take over and prevents further rise in temperature.

The treatment of the catalyst with the water and carbon dioxide must be effected at a temperature below the decomposition temperature of potassium bicarbonate.

The dissociation pressure for the decomposition reaction is approximately $$\log_{10} P = 10.832 - \frac{3420}{T}$$

where P is the total pressure of carbon dioxide and water in mm. and T is the temperature in degrees Kelvin. Some typical values are given in the following table along with the equilibrium constant K.

| Temperature, °C. | K=($P_{CO_2}$)($P_{H_2O}$) in atm.$^2$ | Total Pressure in mm. |
|---|---|---|
| 80 | 0.0001 | 14 |
| 90 | 0.0003 | 25 |
| 100 | 0.0009 | 44 |
| 110 | 0.0026 | 80 |
| 120 | 0.007 | 130 |
| 130 | 0.02 | 220 |
| 140 | 0.05 | 350 |
| 150 | 0.13 | 600 |

At low temperatures, e.g. room temperature, the reaction is slow but, as pointed out above, the temperature quickly rises due to the exothermic heat of the reaction when sufficient reactants are present to supply the reaction. The treatment is preferably effected at temperatures from room temperature up to about 100° C. (preferably 40° C. to 100° C.). The temperature may be controlled by suitable conventional means. In the alternative, the mixture of water vapor and carbon dioxide may be supplied at room temperature without any attempt to control the temperature. The temperature first rises rapidly (assuming an adequate supply of water vapor and carbon dioxide, then levels off at a temperature below 150° C., and then declines due to approach to completion of the reaction. Thus, the heat of reaction may be removed as sensible heat in the gas stream passed through the catalyst or by indirect heat exchange between the catalyst undergoing treatment and a suitable coolant, e.g. water at room temperature. As will be discussed further on, the temperature should, however, be retained sufficiently high that there is no excessive condensation of the water from the gas stream. In order to avoid condensation of water on the catalyst entering the treating zone when operation is continuous, or on the static catalyst remote from the point of introduction of the gas when operating batchwise, it is desirable that the catalyst first contacting the gas stream be at a sufficiently high temperature that water is not condensed upon it from the gas mixture. The catalyst, initially at room temperature, can of course be treated without condensation of water by providing a sufficiently low moisture content in the gas stream. However, if the catalyst is somewhat above room temperature initially e.g. 40–110° C., higher concentrations of water vapor in the gas stream affording faster reaction rates may be used. Thus, for example, it is desirable to cool the product from the final calcination of the catalyst to a temperature above room temperature but below 150° C. and then charge it to the reaction zone where it is reacted with the mixture of water vapor and carbon dioxide.

The pressure at which the treatment is effected is immaterial within practical limits.

The mixture of water vapor and carbon dioxide may be diluted with inert gas, e.g. air, nitrogen, carbon monoxide, flue gas consisting largely of nitrogen and containing minor amounts of carbon monoxide and uncombusted hydrocarbon vapors, natural gas, city gas, or the like. Hydrogen at these low temperatures is also inert and may be used as a diluent. However, there should be a sufficient concentration of carbon dioxide and water vapor to afford a reasonable reaction rate at reasonable gas flow rates. Since the reaction involves both carbon dioxide and water as reactants it will be seen that it will be the concentration of the minor of these constituents that controls the reaction rate. Thus the minor constituent should be present in the gas in a concentration of at least about 2% by volume and preferably at least 4% in order to ensure a reasonable reaction rate at a reasonable gas flow rate. The flow of the gas mixture through or over the catalyst pellets should be sufficient to afford a resonable reaction rate which may be taken to mean at least about 50% conversion of the potassium carbonate to potassium bicarbonate in a few hours. It will generally be the case that the reactants, and more particularly the reactant in the stoichiometric majority, will pass through the catalyst without being fully utilized. The gas in such cases can be recycled, preferably after fortifying with the reactant in short supply. Such recycle is in fact a very desirable method of operating since larger amounts of gas may be circulated and passed through a cooler thereby removing the reaction heat.

One suitable gas is carbon dioxide gas produced by vaporizing solid or liquid carbon dioxide and adding thereto such an amount of water vapor that condensation to liquid water does not occur in the catalyst being treated. Such gas is normally recycled and fortified by the addition of water vapor. Another gas that is suitable is gas produced by the efficient burning of natural gas or other suitable fuel. The combustion gases are cooled to below 150° C. and then adjusted in water concentration. This will be effected, depending upon the carbon-hydrogen ratio of the fuel, by either adding water vapor to the gas or removing water vapor from the gas by cooling or absorption. If the water content of the gas as produced is initially too high it is also possible to rectify this condition by fortifying the combustion gas with additional carbon dioxide from another source.

The process may be effected either continuously or batchwise. When it is effected continuously the gas and catalyst may flow concurrently or countercurrently to each other. The preferred method depends upon whether the exothermic heat of the reaction is removed as sensible heat in the gas or otherwise. When the catalyst is fed to the reaction zone in a relatively hot condition, e.g. as partially cooled product from the final calcination kiln, the gas is preferably passed countercurrently. If the reaction heat is removed by indirect heat exchange a concurrent flow of the gas is preferred, although countercurrent flow is satisfactory.

When the reaction is effected batchwise it is preferably effected with a bed of the catalyst which has a low height to diameter ratio, e.g. below about 3:1, but this is not essential. It is preferred, however, to effect the treatment with the catalyst in at least periodic motion since in some cases where the catalyst is in a stationary bed difficulty may be encountered due to welding of the catalyst pellets.

In a preferred embodiment of the invention the calcined and/or dried catalyst pellets containing the potassium in the form of potassium carbonate is first treated with water to incorporate from about 5 to 25% water, and preferably about 15% water, based on the potassium carbonate content and is subsequently treated with carbon dioxide. By this means the water content may be more accurately controlled and the reaction is considerably faster. Thus, for example, the calcined pellets may be placed in a rotating drum and sprayed with the proper amount of water after which carbon dioxide may be supplied until the reaction substantially ceases.

In another preferred embodiment the formed pellets containing the catalyst in the form of potassium carbonate are not dried and calcined but are partially dried to a water content between about 10 and 25% based on the potassium carbonate present and the thus partially dried pellets are then reacted with carbon dioxide. During the reaction some steam is generally produced. If the loss of water due to this cause is excessive additional water may be supplied with the carbon dioxide. On the other hand, unless there is some loss of water through steam formation it is preferred that the original water content of the pellets when first supplying the carbon dioxide should not be much above 15% based on the potassium carbonate present.

While the catalysts of the invention have been characterized as being useful for the dehydrogenation of normal butylene to butadienes in the presence of steam at temperature between about 550 and 680° C., it is to be understood that they are also useful for other related dehydrogenation processes which are carried out in the presence of steam at approximately these temperature conditions. Thus, for example, they are useful in the production of higher diolefins from higher olefins and the production of styrene and its homologues from alkyl aromatic hydrocarbons having an alkyl group of at least 2 carbon atoms.

*Example I*

An alkalinized iron oxide catalyst was prepared as follows: 286 parts of powdered ferric oxide, 10.1 parts of powdered chromium sesquioxide, 161.8 parts of powdered potassium carbonate were mixed with 75 parts of water to produce an extrudable mix. This mix was extruded in a low pressure laboratory extruder to produce pellets ⅛″ in diameter and about 3/16″ long. The pellets were dried and then calcined at 600° C. for two hours. The pellets were found to have an average crushing strength of 6.5 pounds per pellet.

The crushing strength is measured with a screw type hand tester in which two anvils approximately ⅛″ wide press across the diameter of an individual pellet. A number of pellets are crushed and the average crushing pressure is taken.

*Example II*

A separate portion of the extruded but undried pellets of Example I was partially dried for about 40 minutes in an oven maintained at about 140° C. This reduced the water content of the pellets to about 7.3%. The partially dried pellets were placed in a glass reactor and carbon dioxide was passed through the bed of the pellets. The temperature rose to 73° C. The reaction was substantially completed in about 30 minutes but the carbon dioxide treatment was continued to about 75 minutes. The pellets were then tested and found to have an average crushing strength of 8.8 pounds per pellet.

It is seen that by converting the potassium carbonate in the pellets to potassium bicarbonate the crushing strength is considerably improved.

In order to determine whether it is the presence of the potassium in the form of potassium bicarbonate or the fact that the potassium bicarbonate was produced in situ within the pellets that caused the effect the experiments described in the following Example III were performed.

*Example III*

A catalyst compounded to have the same ultimate chemical composition as those of Examples I and II was prepared using the same raw materials except that in place of potassium carbonate the stoichiometrically equivalent amount of potassium bicarbonate was used. The amount of water (11.9%) was adjusted to produce a mix having the same consistency as that in Example I and the material was extruded under the same conditions. This material was dried for one hour at 120° C. The loss in weight was about 12.4% and about 19% of the potassium bicarbonate decomposed to potassium carbonate during the drying. The crushing strength of the resulting pellets was 5.4 pounds per pellet.

A second sample of the same material dried at 120° C. for 18 hours lost 22% in weight and 94% of the potassium bicarbonate was decomposed. The average crushing strength was 4.7 pounds.

It is evident that the use of potassium bicarbonate as a starting material and the retaining of the potassium in that form does not afford the improved crushing strength.

It should be mentioned that the improvement in pellet strength shown in Example II is not the maximum that could be obtained even with this low pressure extruded product, because it is found that the crushing strength declines as the moisture content of the catalyst is increased. In Example II the moisture content of the pellets at the beginning of the carbonation was considerably more than required for the reaction and in addition the carbon dioxide was metered through a wet test meter and therefore was substantially saturated with water. If the drying had been continued to reduce the moisture content to about 5% and dry carbon dioxide had been used a still higher crushing strength would have been obtained.

*Example IV*

A commercial alkalinized iron oxide dehydrogenation catalyst containing about 31% potassium carbonate and having a pellet strength of about 16 pounds was placed in a tube held at a temperature of 40–52° C. Although it had been calcined the catalyst had picked up about 1.5% water which could be removed by drying at 140° C. A mixture of air and carbon dioxide was passed through a water bath held at 36.7° C. and then through the catalyst. The calculated composition of the gas used was 86.3% air, 7.7% carbon dioxide, 6.0% water. The pellet strength of the thus treated catalyst was 23 pounds.

One of the objects of the invention has been stated to be to provide catalysts which are better able to retain their crushing strength. This will be illustrated in the following examples.

*Example V*

A catalyst was prepared according to the above-described general method using potassium carbonate in the formulation. The catalyst contained about 63% $Fe_2O_3$, 31% $K_2CO_3$ and 6% $K_2CrO_4$. This material was formed into pellets of about ⅛″ diameter and between ⅛ and ¼″ in length by extrusion in a larger machine under considerably higher pressure than in Example I. After calcining at a temperature of about 600° C. the pellets had an average crushing strength of 16 pounds. This catalyst was exposed to air at 90% relative humidity and at 25° C. for 3½ hours. Individual pellets were broken with the tester as described above and the approximate percentage of pellets breaking in 3 ranges (<1, 1–7, 7–26 pounds per pellet) was determined.

| Range, lbs. | Percent crushed |
|---|---|
| <1 | 70 |
| 1–7 | 30 |
| 7–26 | 0 |

It will be noted that whereas the original catalyst had a crushing strength of 16 pounds this crushing strength was greatly reduced (actually to below two pounds) by this moderate exposure.

*Example VI*

A sample (about 48 grams) of the same calcined catalyst as used in Example V was placed in a glass tube and heated to 83° C. by means of a water bath and a mixture of water vapor and carbon dioxide was passed through the sample for about 2½ hours. The mole ratio of carbon dioxide to water vapor in the gas used was about 0.9:1. The catalyst gained 17.2% in weight and about 90% of the potassium carbonate was converted to potassium bicarbonate. The thus treated pellets were then exposed to an atmosphere of 90% relative humidity at 25° C. for 3½ hours and their crushing strength was then determined as in Example V. The results are given below:

| Range, lbs. | Percent Crushed | Average Crushing Strength |
|---|---|---|
| <1 | 0 | |
| 1–7 | 60 | 5.6 |
| 7–26 | 40 | 8.5 |

It will be seen that although there was a loss in pellet strength upon this exposure it was much less than in the conventional catalyst not treated in accordance with the invention (Example V).

Example VII

In another case the same catalyst as used in Example V was treated in the same way as in Example VI except that the temperature was increased to 90° C., the mole ratio of carbon dioxide to water was reduced to about 0.45:1 and the time of treating was reduced to about 84 minutes. About 89% of the potassium carbonate was converted to the bicarbonate. The treated catalyst was exposed and then tested as in Examples V and VI. The results are shown below:

| Range, lbs. | Percent Crushed | Average Crushing Strength |
| --- | --- | --- |
| <1 | 0 | |
| 1–7 | 50 | 5.5 |
| 7–26 | 50 | 9.8 |

Example VIII

A 300 pound batch of commercially extruded and calcined alkalinized iron oxide dehydrogenation catalyst having a chemical composition similar to the catalysts of the above examples and in the form of 3/16" pellets was found to have a crushing strength of about 21 pounds. This material was placed in a slowly rotating tilted drum and during a period of about 80 minutes a fine spray of water was played on it until 5.6% of water had been added. Then about 40 pounds of crushed Dry Ice were added over a period of about 53 minutes while the drum was retained lightly closed. After exposure of the thus treated catalyst for 24 hours in an atmosphere of 80% relative humidity the crushing strength was 9 pounds whereas the unbicarbonated catalyst after such exposure has a crushing strength of only about 1 pound.

Example IX

A 300 pound batch of commercially extruded material corresponding to that used in Example VIII was taken from the extruder before the drying and calcination steps. This material was partially dried to a moisture content of about 7.4%. It was then placed in the rotating drum as in Example VIII and about 40 pounds of crushed Dry Ice were added over a period of about 45 minutes. About 92% of the potassium carbonate was converted to potassium bicarbonate. The crushing strength of the dried but uncalcined pellets was not measured but was clearly too low for a practical catalyst. The crushing strength of the treated material was 18 pounds. After exposure for 24 hours to an atmosphere of 80% relative humidity the crushing strength was 11 pounds which is again much better than that of the untreated catalyst after such exposure.

Example X

A sample (about 71 grams) of calcined catalyst containing about 63% $Fe_2O_3$, 31% $K_2CO_3$ and 6% $K_2CrO_4$ was placed in a tube. Carbon dioxide was bubbled through water at room temperature and passed through the catalyst at about 27° C. The gas mixture was calculated to contain approximately 30 mols of carbon dioxide per mol of water vapor. In one hour the catalyst gained 2.4% in weight and at the end of about 8 hours the conversion to the bicarbonate was substantially complete. A hot zone was observed to pass through the bed of catalyst in the tube. For complete conversion a carbonate content of 24.0% was calculated and 23.7% was found by analyses.

The catalyst so treated was tested for the dehydrogenation of butene-2 to butadiene under the following conditions and with the following results, which showed it to be a good catalyst.

| Gaseous Hourly Space Velocity | 500 Vol. Butene (STP)/Vol. catalyst/hour | | |
| --- | --- | --- | --- |
| Steam/butene mole ratio | 12 | | |
| Temperature, °C | 620 | 640 | 660 |
| Conversion of Butene percent | 30.0 | 39.6 | 50.5 |
| Selectivity for Butadiene, Mole percent | 78.5 | 72.3 | 65.2 |

It will be evident from the above examples that the catalyst of the invention have a superior strength and are much less prone to lose strength. This considerably facilitates the manufacture, storage, shipping and handling.

We hereby claim as our invention:

1. Process for the production of pelletized alkalinized iron oxide dehydrogenation catalyst which comprises combining powdered iron oxide, water and potassium carbonate in an amount sufficient to afford between about 1% to 30% potassium in the finished catalyst, forming the mixture into pellets, drying and calcining the pellets at a temperature between about 200 and 800° C. moistening the pellets with an amount of water between about 10% and 25% based on the potassium carbonate, and then reacting the moistened pellets with carbon dioxide until the exothermic reaction is substantially complete.

2. Process for the production of pelletized alkalinized iron oxide dehydrogenation catalyst which comprises combining with iron oxide and water an amount of potassium carbonate sufficient to afford between about 1 and 30% potassium in the finished catalyst, forming the mixture into pellets, drying the formed pellets to a water content corresponding to between about 10 and 25% based on the content of potassium carbonate and then reacting the partially dried pellets with carbon dioxide at a temperature below 100° C. until the potassium carbonate is substantially converted to potassium bicarbonate.

3. Process for the preparation of pelletized alkalinized iron oxide dehydrogenation catalyst which comprises mixing iron oxide, water, and potassium carbonate in an amount to provide between about 1% and 30% potassium in the finished catalyst, forming the mixture into pellets, drying and calcining the pellets at a temperature between about 200 and 800° C., cooling the calcined pellets to a temperature below 100° C. and then treating them with a gaseous mixture containing carbon dioxide and water vapor until the potassium carbonate in the pellets is substantially converted to potassium bicarbonate.

4. In the production of alkalinized iron oxide dehydrogenation catalyst the improvement which comprises preparing pellets of iron oxide catalyst containing from 1% to 30% potassium in the form of potassium carbonate and then reacting said pellets with carbon dioxide and water at a temperature below about 100° C. until the potassium carbonate in the pellets is substantially converted to potassium bicarbonate.

5. A pelleted dehydrogenation catalyst consisting essentially of alkalinized iron oxide, said pellets containing from about 1 to 30% potassium in the form of potassium bicarbonate produced in the pellets from potassium carbonate by reacting the pellets with carbon dioxide and water at a temperature below about 100° C.

References Cited in the file of this patent

UNITED STATES PATENTS

| | | |
| --- | --- | --- |
| 2,414,585 | Eggertsen | Jan. 21, 1947 |
| 2,509,869 | Kirshenbaum | May 30, 1950 |
| 2,636,011 | Clark | Apr. 21, 1953 |